United States Patent [19]

Borkowski et al.

[11] Patent Number: 4,749,612
[45] Date of Patent: Jun. 7, 1988

[54] COLORED ANTISTATIC ADHESIVE TAPE

[75] Inventors: Norbert Borkowski, Seevetal; Burkhard Schulz, Neumünster; Friedrich Eggerstedt, Pinneberg; Claus Meyer; Gisbert Gafron, both of Hamburg, all of Fed. Rep. of Germany

[73] Assignee: Beiersdorf Aktiengesellschaft, Hamburg, Fed. Rep. of Germany

[21] Appl. No.: 792,092

[22] Filed: Oct. 28, 1985

[30] Foreign Application Priority Data

Nov. 23, 1984 [DE] Fed. Rep. of Germany ....... 3442695

[51] Int. Cl.⁴ ............................ B32B 7/12; C09J 7/02
[52] U.S. Cl. ...................................... 428/246; 428/40; 428/248; 428/343; 428/352
[58] Field of Search ............... 428/244, 343, 248, 352, 428/246, 40; 427/121; 8/495; 361/223

[56] References Cited

U.S. PATENT DOCUMENTS

| | | |
|---|---|---|
| 2,751,276 | 6/1956 | Eaton ........................ 8/495 |
| 3,104,985 | 9/1963 | Williams et al. .................... 427/121 |
| 3,832,598 | 8/1974 | Oehmke et al. .................. 361/223 |
| 4,554,562 | 11/1985 | Afzali-Ardakani et al. ... 427/121 X |
| 4,569,877 | 2/1986 | Tollefson et al. ............... 428/343 X |

Primary Examiner—Thomas J. Herbert
Attorney, Agent, or Firm—Sprung Horn Kramer & Woods

[57] ABSTRACT

Colored, antistatic adhesive tape, characterized in that it comprises
(a) a fabric base
(b) which is coated with carbon black in a binder,
(c) the coating assuming the structure of the fabric base,
(d) and printed with a non-conductive thixotropic ink,
(e) the ink being present in the recesses of the fabric base, as well as
(f) an adhesive on the rear face.

1 Claim, 1 Drawing Sheet

U.S. Patent    Jun. 7, 1988    4,749,612
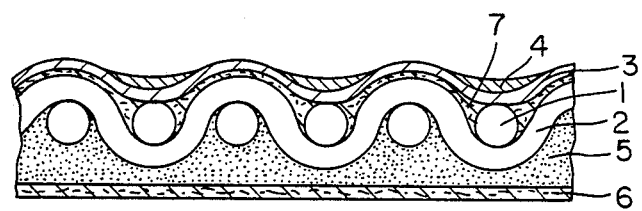

COLORED ANTISTATIC ADHESIVE TAPE

The invention relates to a coloured, antistatic adhesive tape.

Antistatic adhesive tapes are known. They are, in particular, black adhesive tapes, whose surface is coated with particles of carbon black. Thus, U.S. Pat. No. 3,104,985 describes a flexible adhesive tape possessing electrical conductivity and containing carbon black in a binder on the surface. Another electrically conductive adhesive tape of this type is described in U.S. Pat. No. 3,832,598; this also contains carbon black. These tapes acquire the desired property of dissipating electrostatic charges as a result of the carbon black present on the surface, which thereby however also at the same time produces the black colour.

It is true that coloured adhesive tapes surface-printed with an ink are also known. However, these tapes cannot meet the requirements made of an antistatic adhesive tape, since their surface resistance, which is a measure of the capacity for dissipating electrostatic charges does not lie within the range of an antistatic adhesive tape.

However, there is a considerable demand for coloured antistatic adhesive tapes, for example for reasons of aesthetic appearance, for advertising purposes or the like. Moreover, when handling explosives and the like a particular problem arises in that different colours represent different explosive properties from country to country; for example, black represents armour-piercing in the case of the German armed forces. Accordingly, there is a need to provide special classes of explosive with special coloured antistatic adhesive tapes, and not to be forced to employ a standard black antistatic adhesive tape.

It is the object of the invention to remedy this situation and to provide a coloured, antistatic adhesive tape which can be coloured as desired but which on the other hand also possesses a surface resistance adequate for an antistatic adhesive tape.

Accordingly, the invention relates to a coloured antistatic adhesive tape characterised in that it comprises
(a) a fabric base
(b) which is coated with carbon black in a binder,
(c) the coating assuming the structure of the fabric,
(d) and printed with a non-conductive thixotropic ink,
(e) the ink being present in the recesses of the fabric base, as well as
(f) an adhesive on the rear face.

According to the invention, this provides an antistatic adhesive tape which can be coloured as desired without however losing its excellent antistatic properties. The peaks of binder/carbon black protruding from the ink layer are not troublesome and have only an insignificant effect on the colour impression. The specific resistance of an antistatic adhesive tape according to the invention lies in the range from about $10^5$ to $10^7$ ohm.cm, which is necessary for antistatic adhesive tapes, and this is a happy choice in view of the sensitivity of surface resistance to carbon black concentration.

Advantageously, the carbon black concentration in the binder is about 10 to 30% by weight. In particular, the carbon black is a finely divided pigment black, such as is commercially available. It is advantageously applied as a dispersion, in particular in water, advantageously with the use of anionic wetting agents. Such an aqueous dispersion advantageously contains about 25% by weight of carbon black and 2% by weight of wetting agent.

As binders it is possible to use a binder commercially available for these purposes, in particular a thermally crosslinkable EVA copolymer. The binders is also advantageously used a dispersion, in particular in water, at a solids content of about 40-60% by weight. Accordingly, such a dispersion has a solids content which consists of about 70-90% by weight of binder and about 10-30% by weight of carbon black advantageously with the addition of about 2% by weight of wetting agent.

The fabric base advantageously has a linen-type weave and is in particular a rayon fabric. It has about 25-30 ends and 25-30 picks, at a yarn denier of, advantageously, 15-25 tex, this having proved advantageous for the adhesive tape according to the invention.

Suitable thixotropic inks are in particular those which can be applied by flexographic printing. Because of the structure of the fabric, this ink collects in the "valleys" without however completely covering the surface of the binder containing carbon black. Any colour shade can be chosen, but olive is particularly preferred because of the specific requirements of the army, especially the German armed forces.

The adhesive used can be pressure-sensitive adhesives or heat-sealable adhesives, of types known per se. They are well known in the state of the art and are commercially available. In particular, suitable pressure-sensitive adhesives are those based on acrylate or rubber. Advantageously, the adhesive is covered in a manner known per se, especially by means of a release paper or a film.

Advantageously, the fabric base is precoated in order to seal the fabric and to prevent strike-through of the composition to be applied. Compositions known per se, especially those of the acrylate dispersion type, are suitable for this purpose.

Finally a marking print, depending on the specific requirements, can be applied to the surface of the adhesive tape according to the invention. However, marking print does not include an overall print, since this would interfere with the antistatic properties of the adhesive tape.

The invention is explained below with reference to an illustrative embodiment, without however thereby intending to imply any limitation. Rather, a man skilled in the art can, by virtue of his expert knowledge, provide alternatives or supplementary features within the framework of the invention.

BRIEF DESCRIPTION OF THE DRAWING

The FIGURE diagrammatically shows a cross-section through an adhesive tape according to the invention. A fabric comprising the warp 1 and filling 2 is coated with a binder 7. This is followed by the layer 3, containing carbon black, which also assumes the structure of the fabric. In the recesses remaining on the surface there is a thixotropic ink 4, with peaks of the layer 3, containing carbon black, protruding in between. On the underside of the fabric is the layer of an adhesive 5 which in turn is covered by a release paper 6.

The composition and structure is explained in more detail below.

EXAMPLE 1

Fabric base: rayon fabric, linen-type weave

|  | Warp | Filling |
| --- | --- | --- |
| Yarn spacing |  | 30 tex/28 tex |
| Denier |  | 20 tex/20 tex | coated with 75 g/m$^2$ of an acrylate composition consisting of
  Acronal 500 D—103.4 parts by weight,
  Fillers—48.3 parts by weight,
  Ammonia—1.7 parts by weight,
to seal the fabric.
  Binder containing carbon black and consisting of
  Vinnapas LT 420—65 parts by weight,
  Vinnapas EN 428—35 parts by weight,
  Derussol VU 25L—30 parts by weight,
Coating thickness about 18 g/m$^2$, giving a surface resistance of $3.10^4$ ohm.cm.

The adhesive composition is a thermally crosslinkable rubber composition applied in a thickness of 120 g/m$^2$ and covered with a white release paper.

Printing is effected with PVC printing ink
  Black—150 parts by weight
  Yellow—1500 parts by weight
by flexographic printing.

A marking print is applied, as required, by flat screen printing.

We claim:
1. A colored antistatic adhesive tape comprising
   (a) a fabric base
   (b) which is coated with carbon black in a thermally crosslinkable EVA copolymer as binder, the carbon black concentration in the binder being about 10–30% by weight,
   (c) the coating assuming the structure of the fabric base,
   (d) and printed with a non-conductive thixotropic ink of a color other than black,
   (e) the ink being present in the recesses of the fabric base, as well as
   (f) an adhesive on the rear face.

* * * * *